United States Patent
Jung et al.

(10) Patent No.: US 12,394,431 B2
(45) Date of Patent: Aug. 19, 2025

(54) SYNTHETIC VOICE DETECTION METHOD BASED ON BIOLOGICAL SOUND, RECORDING MEDIUM AND APPARATUS FOR PERFORMING THE SAME

(71) Applicant: Foundation of Soongsil University-Industry Cooperation, Seoul (KR)

(72) Inventors: Souhwan Jung, Seoul (KR); Kihun Hong, Seoul (KR); Thien-Phuc Doan, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 276 days.

(21) Appl. No.: 18/073,779

(22) Filed: Dec. 2, 2022

(65) Prior Publication Data
US 2024/0079027 A1 Mar. 7, 2024

(30) Foreign Application Priority Data

Sep. 2, 2022 (KR) .................. 10-2022-0111400
Oct. 11, 2022 (KR) .................. 10-2022-0129615

(51) Int. Cl.
*G10L 25/78* (2013.01)
*G10L 21/10* (2013.01)

(52) U.S. Cl.
CPC .............. *G10L 25/78* (2013.01); *G10L 21/10* (2013.01)

(58) Field of Classification Search
CPC ......... G10L 25/78; G10L 21/10; G10L 17/02; G10L 17/26
See application file for complete search history.

(56) References Cited

U.S. PATENT DOCUMENTS

| 2020/0035247 A1 * | 1/2020 | Boyadjiev | ............... G06F 21/32 |
| 2022/0172739 A1 * | 6/2022 | Shor | ....................... G10L 25/51 |
| 2023/0343342 A1 * | 10/2023 | Traynor | .................. G10L 17/06 |

FOREIGN PATENT DOCUMENTS

| KR | 10-2005-0049207 A | 5/2005 | |
| KR | 101382356 B1 * | 4/2014 | ............ G11B 20/10 |
| KR | 10-2019-0131806 A | 11/2019 | |
| KR | 10-2022-0040813 A | 3/2022 | |
| KR | 102415519 B1 * | 7/2022 | .......... H04M 3/4936 |

* cited by examiner

*Primary Examiner* — Bhavesh M Mehta
*Assistant Examiner* — Jangwoen Lee
(74) *Attorney, Agent, or Firm* — Stein IP LLC

(57) ABSTRACT

Provided is a method for detecting a synthetic voice based on a biological sound, the method comprises receiving an audio stream; extracting a biological feature vector corresponding to a meaningless voice from the audio stream; extracting a synthetic voice feature vector from the audio stream; combining the biological feature vector and the synthetic voice feature vector to generate a combined feature vector; and determining whether the audio stream is a synthetic voice based on the combined feature vector. Accordingly, it is possible to detect a synthetic voice at a lower computational cost than a conventional neural network that detects a synthetic voice by learning the correlation between frames.

9 Claims, 3 Drawing Sheets

SYNTHETIC VOICE DETECTION METHOD BASED ON BIOLOGICAL SOUND, RECORDING MEDIUM AND APPARATUS FOR PERFORMING THE SAME

CROSS-REFERENCE TO RELATED APPLICATIONS

This application claims the benefit of Korean Application No. 10-2022-0111400, filed Sep. 2, 2022, and Korean Application No. 10-2022-0129615, filed Oct. 11, 2022 in the Korean Intellectual Property Office. All disclosures of the documents named above are incorporated herein by reference.

TECHNICAL FIELD

The present invention relates to a synthetic voice detection method based on a biological sound, a recording medium and an apparatus for performing the same, and more particularly, a synthetic voice detection method based on a biological sound capable of detecting a synthesized voice, and a recording medium and an apparatus for performing the same.

BACKGROUND ART

Due to the development of deep learning technology, voice synthesis technology has advanced to a level where it is difficult to distinguish a fake voice from a real voice.

While such synthetic voices are effectively used in various fields such as AI assistants, there is a possibility that they may be abused for voice fishing or fake news generation and dissemination.

Therefore, in order to respond to abuse cases of synthetic voice, a technique for detecting synthesized voice is required.

To this end, the conventional synthetic voice detection method detects a synthetic voice by learning the correlation between each voice frame in an audio stream, but has a problem in that the detection rate of the synthetic voice is low.

Therefore, there is a need for a detecting method that can increase the detection rate of the synthesized voice without the size of the model being large.

DISCLOSURE

Patent Literature

Korean Patent Application Publication No. 10-2005-0049207

Technical Problem

The present invention has been devised to solve the above problems, and an object of the present invention is to provide a synthetic voice detecting method based on a biological sound that can increase the detection rate of a synthetic voice compared to a conventional neural network that detects a synthetic voice by comparing the frequency characteristics of a pre-learned real voice with the frequency characteristics of an input voice, and a recording medium and an apparatus for performing the same.

Technical Solution

The method for detecting a synthetic voice based on a biological sound for achieving the above object comprises receiving an audio stream; extracting a biological feature vector corresponding to a meaningless voice from the audio stream; extracting a synthetic voice feature vector from the audio stream; combining the biological feature vector and the synthetic voice feature vector to generate a combined feature vector; and determining whether the audio stream is a synthetic voice based on the combined feature vector.

The extracting the biological feature vector may comprise extracting the biological feature vector by inputting the audio stream to a pre-trained biological sound segmentation model.

Further, the biological sound segmentation model may extract the biological feature vector by converting the audio stream into a spectogram, dividing the spectogram into a plurality of frames, classifying a biological sound type for each divided frame, and assigning a corresponding ID to each classified biological sound type.

The extracting the biological feature vector may comprise converting the biological feature vector into a score embedding vector of a preset size.

Further, the combining the biological feature vector and the synthetic voice feature vector may comprise downsampling the biological feature vector and the synthetic voice feature vector into a predetermined length and combining them.

The determining whether the audio stream may be a synthetic voice comprises outputting a probability that the audio stream is a real voice and a probability that the audio stream is the synthetic voice.

The recording medium for achieving the above object according to one embodiment of the present invention may be a computer-readable recording medium including a computer program for performing the synthetic voice detecting method.

The apparatus for detecting a synthetic voice for achieving the above object according to one embodiment of the present invention may comprise an input unit for receiving an audio stream; a biological feature vector extracting unit for extracting a biological feature vector corresponding to a meaningless voice from the audio stream; a synthetic speech feature vector extracting unit for extracting a synthetic voice feature vector from the audio stream; a combining unit for combining the biological feature vector and the synthetic voice feature vector to generate a combined feature vector; and a determining unit for determining whether the audio stream is a synthetic voice based on the combined feature vector.

The biological feature vector extracting unit may comprise a segmentation unit for inputting the audio stream to a pre-trained biological sound segmentation model.

Further, the biological sound segmentation model may extract the biological feature vector by converting the audio stream into a spectogram, dividing the spectogram into a plurality of frames, classifying a biological sound type for each divided frame, and assigning a corresponding ID to each classified biological sound type.

The biological feature vector extracting unit may comprise a scoring embedding unit for converting the biological feature vector into a score embedding vector of a preset size.

Further, the combining unit may down-sample the biological feature vector and the synthetic voice feature vector into a predetermined length and combines them.

The determining unit may output a probability that the audio stream is a real voice and a probability that the audio stream is the synthetic voice.

Advantageous Effects

According to one aspect of the present invention described above, by providing a synthetic voice detecting method based on a biological sound, and a recording medium and an apparatus for performing the same, it is possible to increase the detection rate of a synthetic voice rather than the conventional neural network that detects a synthetic voice by comparing frequency characteristics of a pre-learned real voice and frequency characteristics of an input voice.

DESCRIPTION OF DRAWINGS

These and/or other aspects will become apparent and more readily appreciated from the following description of the embodiments, taken in conjunction with the accompanying drawings in which.

DETAILED DESCRIPTION OF EMBODIMENTS

Figure 1:
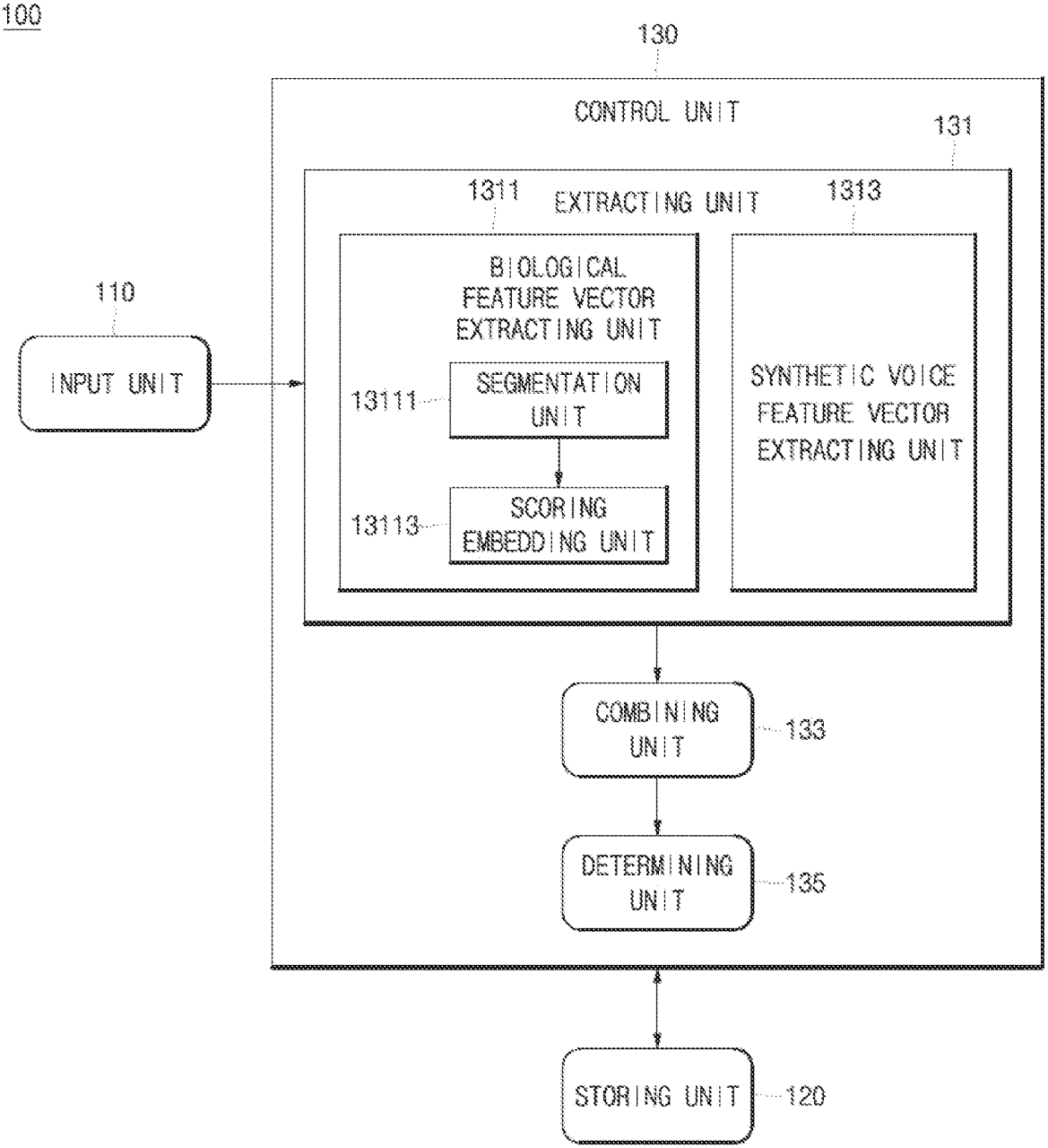
FIG. 1 is a block diagram illustrating an apparatus for detecting a synthetic voice according to an embodiment of the present invention.

Detailed description of the present invention refers to the accompanying drawings, which show by way of illustration specific embodiments in which the present invention may be practiced. These embodiments are described in sufficient detail to enable those skilled in the art to practice the present invention. It should be understood that the various embodiments of the present invention are different but need not be mutually exclusive. For example, certain shapes, structures, and characteristics described herein with respect to one embodiment may be implemented in other embodiments without departing from the spirit and scope of the invention. In addition, it should be understood that the position or arrangement of individual components within each disclosed embodiment may be changed without departing from the spirit and scope of the present invention. Accordingly, the detailed description set forth below is not intended to be taken in a limiting sense, and the scope of the present invention, if properly described, is limited only by the appended claims, along with all scope equivalents to those claimed. Like reference numerals in the drawings refer to the same or similar functions throughout the various aspects.

Components according to the present invention are components defined by functional division, not physical division, and may be defined by the functions each performed. Each component may be implemented as hardware or a program code and a processing unit performing each function, and the functions of two or more components may be implemented by being included in one component. Therefore, in the following embodiments, the names given to the components are given to imply a representative function performed by each component, not to physically distinguish each component, and it should be noted that the technical spirit of the present invention is not limited by the name of the component.

Hereinafter, preferred embodiments of the present invention will be described in more detail with reference to the drawings.

Figure 2:
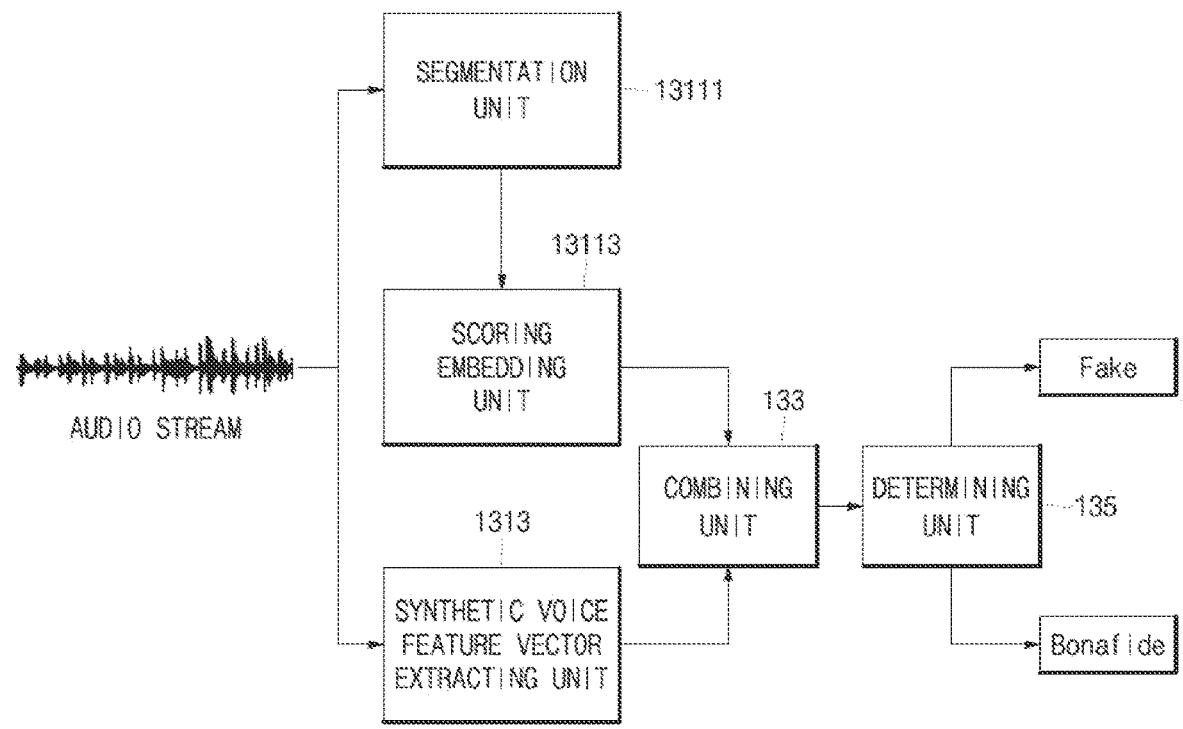
FIG. 2 is a view for describing the synthetic voice detecting apparatus of FIG. 1 in detail.
Figure 3:
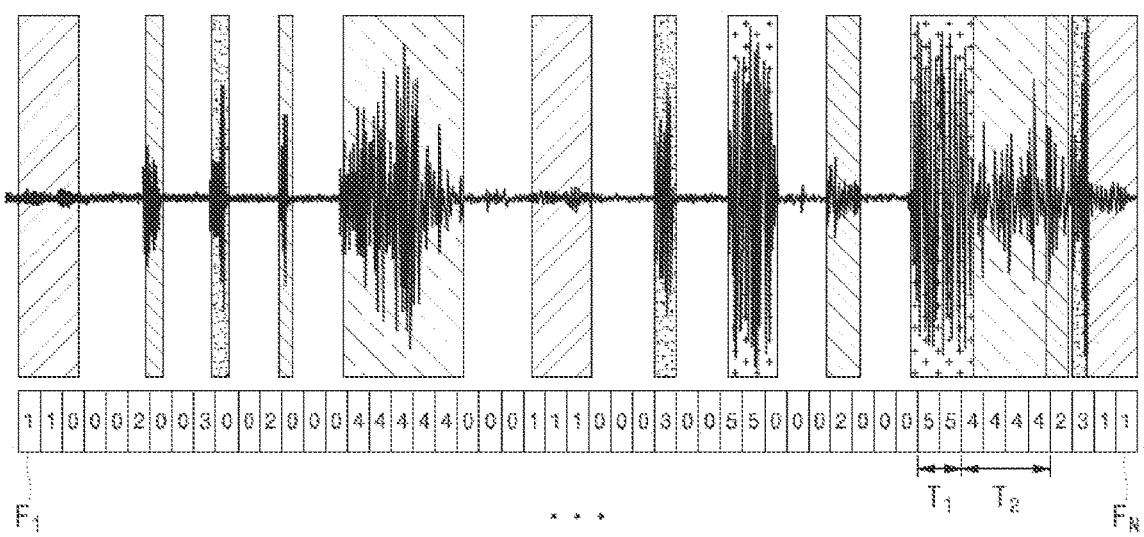
FIG. 3 is a view for describing in detail the biological feature vector extracting unit of FIG. 1.

FIG. 1 is a block diagram for describing the synthetic voice detecting apparatus 100 according to an embodiment of the present invention, FIG. 2 is a diagram for describing the synthetic voice detecting apparatus 100 of FIG. 1 in detail, and FIG. 3 is a diagram for describing in detail the biological feature vector extracting unit 1311 of FIG. 1.

The synthetic voice detecting apparatus 100 (hereinafter referred to as an apparatus) according to an embodiment of the present invention is provided to detect a synthetic voice, that is, a fake voice.

Specifically, synthetic voices generated using artificial intelligence are voices generated by artificial intelligence that has learned the relationship between text and sound, so it is difficult to train by expressing biological sounds as text. Therefore, synthetic voices generated using artificial intelligence are inevitably absent or very few of the above-mentioned biological sounds.

Accordingly, the apparatus 100 according to an embodiment of the present invention may detect a synthetic voice based on a biological sound.

To this end, the apparatus 100 according to the present embodiment may include an input unit 110, a storing unit 120, and a control unit 130. In addition, the apparatus 100 may have software (application) installed and executed for performing the synthetic voice detecting method, and the input unit 110, the storing unit 120, and the control unit 130 may be controlled by software (application) for performing the synthetic voice detecting method.

The input unit 110 may receive an audio stream that is a voice for training or a voice for determining whether it is a synthetic voice. Also, the input unit 110 may receive an audio stream in real time or a recorded voice.

In the storing unit 120, a program for performing the synthetic voice detecting method is recorded. Also, the storing unit 120 temporarily or permanently stores the data processed by the control unit 130, and may include a volatile storage medium or a non-volatile storage medium, but the scope of the present invention is not limited thereto.

In addition, the storing unit 120 stores data accumulated while performing the synthetic voice detecting method. For example, the storing unit 120 may store a data set for training, a biological sound segmentation model, a sequence model, an embedding vector, and the like.

The control unit 130 is provided to control the entire process of providing the synthetic voice detecting method. The control unit 130 may include an extracting unit 131, a combining unit 133, and a determining unit 135.

The extracting unit 131 is provided to extract a feature vector from an audio stream, and may include a biological feature vector extracting unit 1311 and a synthetic voice feature vector extracting unit 1313.

In addition, the extracting unit 131 may pre-process the input audio stream in order to extract a feature vector in the biological feature vector extracting unit 1311 and the synthetic voice feature vector extracting unit 1313. Specifically, the extracting unit 131 may extract information of different frequency bands from the audio stream by using a Mel-Frequency Cepstral Coefficient (MFCC) or Linear Frequency Cepstral Coefficients (LFCC).

Here, the MFCC may be a technique for extracting signals of each frequency band using a Mel-Scale, which is provided to emphasize the energy of a frequency band sensitive to human hearing from an audio signal that appears in a plurality of frequency bands. Through this, the extracting unit 131 may extract information of a plurality of frequency bands from a sound separated from one segment according to a preset number of frequency dimensions.

And, LFCC uses a linear scale frequency band as a linear frequency cepstral coefficient transformed from MFCC, and may use Discrete Fourier Transform/Fast Fourier Transform (DFT/FFT) or DCT (Discrete Cosine Transform) to extract LFCC.

First, the biological feature vector extracting unit 1311 included in the extracting unit 131 is provided to extract a biological feature vector corresponding to a meaningless voice from an audio stream.

Specifically, the biological feature vector extracting unit 1311 may extract a biological feature vector based on a biological sound, which is a meaningless voice intentionally or unconsciously made by a person among sounds included in the audio stream.

Here, biological sounds may be a sound corresponding to a meaningless voice, such as, for example, breathing sounds like a sigh, a throat trimming sound like 'um,' wind noise made by squeezing the nose, a sound made by rubbing the lips, sounds like 'zep' when opening a mouth to speak, a sound of swallowing saliva, a sound of sneezing, a sound of coughing, a sound of tongue clicking, and the like.

Accordingly, when the audio stream includes a meaningless voice, a biological feature vector corresponding to the meaningless voice may be extracted through the biological feature vector extracting unit 1311.

To this end, the biological feature vector extracting unit 1311 may include a segmentation unit 13111 and a scoring embedding unit 13113.

The segmentation unit 13111 may extract a biological feature vector by inputting an audio stream to a biological sound segmentation model, which is a pre-trained model to extract biological voice.

For example, a Gaussian Mixture Model (GMM) classifier, which is a Gaussian mixture model called audio segmentation, may be used as a biological sound segmentation model.

The biological sound segmentation model may convert an audio stream into a spectrogram as shown in FIG. 3. In addition, the biological sound segmentation model may use a short-time Fourier Transform (STFT) to transform an audio stream into a linear spectogram, and the spectogram is utilized as an acoustic feature.

In addition, the biological sound segmentation model may divide the spectogram into a plurality of frames ($F_1$ to $F_N$).

Thereafter, the biological sound segmentation model can extract a biological feature vector by classifying a biological sound type for each divided frame, and assigning a corresponding ID to each of the classified biological sound types.

Specifically, the biological sound segmentation model learns about sound type probabilities for each divided frame using various biological sound data sets. And, the biological sound segmentation model divides the input biological sound into frames of a predetermined length, and the output result is expressed as a vector, which is the ID of the biological sound. That is, since the same color in FIG. 3 means the same biological sound, it has the same ID, and 0 is assigned to an unknown sound.

Meanwhile, the scoring embedding unit 13113 is provided to convert the biological feature vector into a score embedding vector of a preset size.

The scoring embedding unit 13113 converts the biological feature vector into a vector of a fixed size called score embedding because biological sounds of each sound type have different effects on synthetic voice detection.

The scoring embedding unit 13113 may convert a biological feature vector into a score embedding vector using a pre-trained sequence model.

For example, the sequence model may be composed of a neural network such as a Recurrent Neural Network (RNN), a Transformer, or a Convolutional Neural Network (CNN).

Specifically, the biological feature vector extracted by the segmentation unit 13111 has various lengths T1 and T2 as shown in FIG. 3.

Accordingly, the scoring embedding unit 13113 processes biological feature vectors having various lengths as sequence data, that is. time series data, and inputs them to the sequence model.

Through this, the scoring embedding unit 13113 may extract the last hidden data of the model by encoding the biological feature vector. Thereafter, the encoded data may be converted into a scoring embedding vector of length H through a fully connected layer without an activation function.

Meanwhile, the synthetic voice feature vector extracting unit 1313 may be provided to extract the synthetic voice feature vector from the audio stream.

The synthetic voice feature vector extracting unit 1313 is provided to analyze and detect the synthetic voice as a feature of the synthetic voice, and may be provided as a feature extraction module of the synthetic voice.

Specifically, the synthetic voice feature vector extracting unit 1313 may be trained by using a data set including a real voice made by a real human utterance and a synthetic voice corresponding thereto and generated through artificial intelligence. In other words, the synthetic voice feature vector extracting unit 1313 may use the artificial intelligence model generated by learning about the difference in waveform between the real voice and the synthetic voice.

Accordingly, the synthetic voice feature vector extracting unit 1313 may extract the synthetic voice feature vector from the audio stream through the previously trained artificial intelligence model.

In addition, the synthetic voice feature vector extracting unit 1313 may extract features based on a frequency difference such as the presence or absence of a high frequency component, but it is only an example and the present embodiment is not limited thereto.

In the artificial intelligence model used by the synthetic voice feature vector extracting unit 1313 in the present invention, the softmax layer is removed, and the last layer becomes an information layer.

Meanwhile, the combining unit 133 is provided to combine the biological feature vector extracted by the biological feature vector extracting unit 1311 and the synthetic voice feature vector extracted by the synthetic voice feature vector extracting unit 1313.

The combining unit 133 may down-sample the biological feature vector and the synthetic voice feature vector into a specific length and combine them. Specifically, the combining unit 133 may connect the output of the scoring embedding unit 13113 and the output of the synthetic voice feature vector extracting unit 1313 with a pooling layer, and then down-sample the input data to a specific length through the linear layer.

The determining unit 135 determines whether the audio stream is synthetic voice based on the feature vector combined by the combining unit 133.

The determining unit 135 may use an activation function to calculate a distribution of a combined feature vector by including a softmax layer. Accordingly, the determining unit 135 may output a probability that the audio stream is a real voice (Bonafide) and a probability that the audio stream is a synthetic voice (Fake) as shown in FIG. 2.

In more detail, the determining unit 135 may output a probability for the corresponding voice based on the combined feature vector. For example, when the probability of 0.8, 0.2 is output, it may mean 80% probability of a real voice and 20% probability of a fake voice.

In order to calculate such a probability, the determining unit 135 generally processes the output of the last layer of the model using an activation function such as ReLU or softmax.

Accordingly, the apparatus 100 according to an embodiment may detect whether the input audio stream is a synthetic voice based on the presence of a biological sound.

In particular, when a synthetic voice generator adds a biological sound between synthetic voices, a difference between the added biological sound and the synthetic voice is shown, so that it can be detected.

Furthermore, since the apparatus 100 according to an embodiment can be used as an additional function to increase the detection rate of the existing synthetic voice detecting system, it can be used to enhance the conventional detection function in tampering (spoofing) detection. In addition, it has the advantage of being suitable for TTS (Text-To-Speech) synthetic voice detection that synthesizes text into voice.

Figure 4:
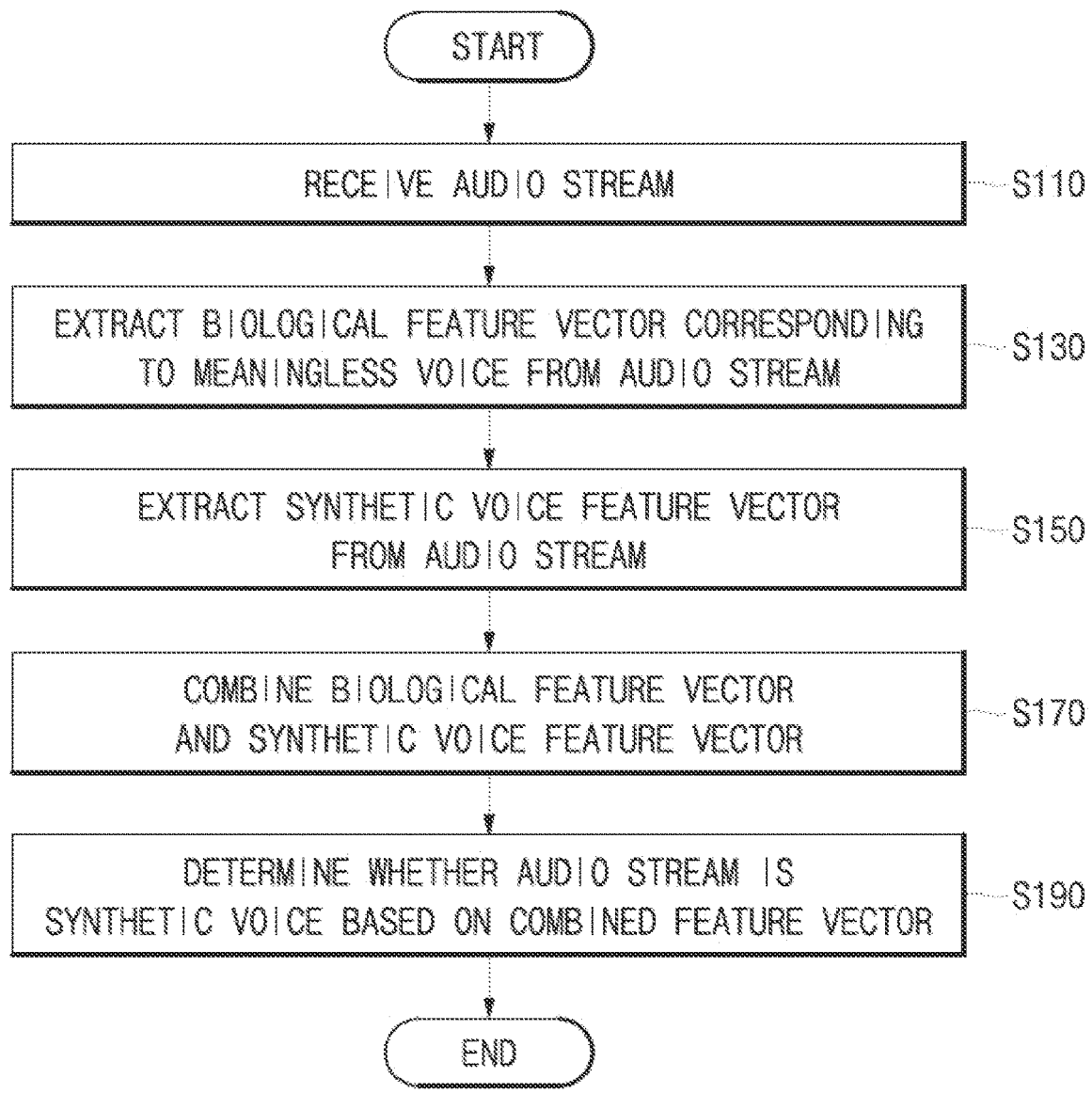
FIG. 4 is a flowchart illustrating a method for detecting a synthetic voice performed in the synthetic voice detecting apparatus of FIG. 1.

Meanwhile, FIG. 4 is a flowchart for describing a synthetic voice detecting method according to an embodiment of the present invention. Since the synthetic voice detecting method according to an embodiment of the present invention proceeds in substantially the same configuration as the synthetic voice detecting apparatus 100 shown in FIGS. 1 to 3, the same reference numerals are assigned to the same components as those of the synthetic voice detecting apparatus 100 of FIGS. 1 to 3, and redundant descriptions will be omitted.

The synthetic voice detecting method of the present invention may comprise steps of receiving an audio stream (S110), extracting a biological feature vector (S130), extracting a synthetic voice feature vector (S150), combining (S170), and determining (S190).

In the step of receiving the audio stream (S110), the input unit 110 may receive an audio stream that is a voice for training or a voice for determining whether it is a synthetic voice.

The step of extracting the biological feature vector (S130) may be a step, in which the biological feature vector extracting unit 1311 extracts the biological feature vector corresponding to the meaningless voice from the audio stream.

In the step of extracting the biological feature vector (S130), the segmentation unit 13111 may input an audio stream to the pre-trained biological sound segmentation model and extract the biological feature vector.

Here, the biological sound segmentation model may convert an audio stream into a spectogram. In addition, the biological sound segmentation model can use a short-time Fourier Transform (STFT) to transform an audio stream into a linear spectogram, and the spectogram is utilized as an acoustic feature.

In addition, the biological sound segmentation model may divide the spectogram into a plurality of frames.

Thereafter, the biological sound segmentation model may extract a biological feature vector by classifying a biological sound type for each divided frame, and assigning a corresponding ID to each of the classified biological sound types.

The step of extracting the biological feature vector (S130) may further include the step of the scoring embedding unit 13113 converting the biological feature vector into a score embedding vector of a preset size.

The step of extracting the biological feature vector (S130) may be a step of converting the biological feature vector into a vector of a fixed size called score embedding because the biological sounds of each sound type have different effects on synthetic voice detection. To this end, in the step of extracting the biological feature vector (S130), the scoring embedding unit 13113 may convert the biological feature vector into a score embedding vector using a pre-trained sequence model.

Meanwhile, in the step of extracting the synthetic voice feature vector (S150), the synthetic voice feature vector extracting unit 1313 may extract the synthetic voice feature vector from the audio stream.

In the step of extracting the synthetic voice feature vector (S150), the synthetic voice feature vector extracting unit 1313 may use an artificial intelligence model generated by learning about the difference in waveform between the real voice and the synthetic voice.

Accordingly, in the step of extracting the synthetic voice feature vector (S150), the synthetic voice feature vector extracting unit 1313 may extract the synthetic voice feature vector from the audio stream through the previously trained artificial intelligence model.

Thereafter, in the combining step (S170), the combining unit 133 may combine the biological feature vector and the synthetic voice feature vector.

In the combining step (S170), the combining unit 133 may down-sample the biological feature vector and the synthetic voice feature vector into a specific length and combine them.

Meanwhile, the determining step (S190) may be a step, in which the determination unit 135 determines whether the audio stream is synthetic voice or not based on the combined feature vector.

And, in the determining step (S190), the determining unit 135 may output a probability that the audio stream is a real voice and a probability that the audio stream is a synthetic voice.

Through this, the synthetic voice detecting method based on the biological sound of the present invention can contribute in increasing the detection rate by being utilized as an additional function in the existing synthetic voice detecting system.

The synthetic voice detecting method based on the biological sound of the present invention may be implemented in the form of program instructions that can be executed through various computer components and recorded in a computer-readable recording medium. The computer-readable recording medium may include program instructions, data files, data structures, etc. alone or in combination.

The program instructions recorded on the computer-readable recording medium may be specially designed and configured for the present invention, or may be known and available to those skilled in the computer software field.

Examples of the computer-readable recording medium include a magnetic medium such as a hard disk, a floppy disk and a magnetic tape, an optical recording medium such as a CD-ROM and DVD, and a magneto-optical medium such as a floptical disk, and hardware devices specially configured to store and execute program instructions such as ROM, RAM, flash memory, and the like.

Examples of program instructions include not only machine language codes such as those generated by a compiler, but also high-level language codes that can be executed by a computer using an interpreter or the like. The hardware device may be configured to operate as one or more software modules to perform processing according to the present invention, and vice versa.

In the above, various embodiments of the present invention have been illustrated and described, but the present invention is not limited to the specific embodiments described above, and various modifications can be made by those skilled in the art to which the invention pertains without departing from the gist of the invention as claimed in the claims. Such modifications should not be individually understood from the technical spirit or perspective of the present invention.

REFERENCE NUMERAL

100: synthetic voice detecting apparatus 100: input unit
120: storing unit 130: control unit
131: extracting unit 1311: biological feature vector extracting unit
13111: segmentation unit 13113: scoring embedding unit
1313: synthetic voice feature vector extracting unit 133: combining unit
135: determining unit

The invention claimed is:

1. A method for detecting a synthetic voice based on a biological sound comprising:
receiving an audio stream;
extracting a biological feature vector corresponding to a meaningless voice from the audio stream;
extracting a synthetic voice feature vector from the audio stream;
combining the biological feature vector and the synthetic voice feature vector to generate a combined feature vector; and
determining whether the audio stream is a synthetic voice based on the combined feature vector,
wherein extracting the biological feature vector comprises extracting the biological feature vector by inputting the audio stream to a pre-trained biological sound segmentation model, encoding the biological feature vector using a sequence model to extract encoded data corresponding to the last hidden state of the sequence model, and converting the encoded data into a scoring embedding vector of length H through a fully connected layer without an activation function,
wherein the biological sound segmentation model extracts the biological feature vector by converting the audio stream into a spectrogram, dividing the spectrogram into a plurality of frames, classifying a biological sound type for each divided frame, and assigning a corresponding ID to each classified biological sound type.

2. The method of claim 1, wherein extracting the biological feature vector comprises converting the biological feature vector into a score embedding vector of a preset size.

3. The method of claim 1, wherein combining the biological feature vector and the synthetic voice feature vector comprises down-sampling the biological feature vector and the synthetic voice feature vector into a predetermined length and combining them.

4. The method of claim 1, wherein determining whether the audio stream is a synthetic voice comprises outputting a probability that the audio stream is a real voice and a probability that the audio stream is the synthetic voice.

5. A computer-readable recording medium including a computer program for performing the synthetic voice detecting method according to claim 1.

6. An apparatus for detecting a synthetic voice comprising:
an input unit for receiving an audio stream;
a biological feature vector extracting unit for extracting a biological feature vector corresponding to a meaningless voice from the audio stream;
a synthetic voice feature vector extracting unit for extracting a synthetic voice feature vector from the audio stream;
a combining unit for combining the biological feature vector and the synthetic voice feature vector to generate a combined feature vector; and
a determining unit for determining whether the audio stream is a synthetic voice based on the combined feature vector,
wherein the biological feature vector extracting unit comprises a segmentation unit for inputting the audio stream to a pre-trained biological sound segmentation model, and encodes the biological feature vector using a sequence model to extract encoded data corresponding to the last hidden state of the sequence model, and converts the encoded data into a scoring embedding vector of length H through a fully connected layer without an activation function,
wherein the biological sound segmentation model extracts the biological feature vector by converting the audio stream into a spectrogram, dividing the spectrogram into a plurality of frames, classifying a biological sound type for each divided frame, and assigning a corresponding ID to each classified biological sound type.

7. The apparatus of claim 6, wherein the biological feature vector extracting unit comprises a scoring embedding unit for converting the biological feature vector into a score embedding vector of a preset size.

8. The apparatus of claim 6, wherein the combining unit down-samples the biological feature vector and the synthetic voice feature vector into a predetermined length and combines them.

9. The apparatus of claim 6, wherein the determining unit outputs a probability that the audio stream is a real voice and a probability that the audio stream is the synthetic voice.

* * * * *